United States Patent
Gorokhovsky et al.

[11] Patent Number: 5,878,609
[45] Date of Patent: Mar. 9, 1999

[54] ANTITHEFT LOCKING DEVICE FOR A VEHICLE

[76] Inventors: Mark Gorokhovsky, 490-33rd Ave. #206, San Francisco, Calif. 94121; Gennady Gorokhovsky, 1290-25th Ave. #203, San Francisco, Calif. 94122

[21] Appl. No.: 907,442

[22] Filed: Aug. 8, 1997

[51] Int. Cl.⁶ .................................................. B60R 25/02
[52] U.S. Cl. ............................................. 70/209; 70/226
[58] Field of Search .......................... 70/209, 226, 211, 70/212, 225, 237, 238

[56] References Cited

U.S. PATENT DOCUMENTS

| | | | |
|---|---|---|---|
| 4,882,920 | 11/1989 | Wu ........................................... | 70/209 |
| 5,055,823 | 10/1991 | Fuller ....................................... | 70/211 |
| 5,097,685 | 3/1992 | Lien ......................................... | 70/209 |
| 5,297,406 | 3/1994 | Lin ........................................... | 70/209 |
| 5,353,614 | 10/1994 | Anderson ................................. | 70/226 |
| 5,454,240 | 10/1995 | Whitney ................................... | 70/226 |
| 5,540,067 | 7/1996 | Kim ......................................... | 70/226 |
| 5,555,754 | 9/1996 | Ferrante ................................... | 70/226 |
| 5,595,078 | 1/1997 | Harrell ..................................... | 70/226 |
| 5,605,063 | 2/1997 | Taurog ..................................... | 70/226 |
| 5,613,383 | 3/1997 | Banez ....................................... | 70/226 |
| 5,666,832 | 9/1997 | Cunningham ............................ | 70/238 |
| 5,676,001 | 10/1997 | Ho ............................................ | 70/226 |
| 5,678,433 | 10/1997 | Riccitelli ................................. | 70/209 |
| 5,706,681 | 1/1998 | Gorokhovsky ........................... | 70/209 |
| 5,735,149 | 4/1998 | Winner, Jr. ............................... | 70/209 |
| 5,735,150 | 4/1998 | Desouza ................................... | 70/209 |

FOREIGN PATENT DOCUMENTS

| | | | |
|---|---|---|---|
| 1415660 | 11/1975 | United Kingdom .................... | 70/211 |
| 1467816 | 3/1977 | United Kingdom .................... | 70/238 |

*Primary Examiner*—Darnell M. Boucher
*Attorney, Agent, or Firm*—Ilya Zborovsky

[57] ABSTRACT

The invention is based on the principle that the antitheft device has a body of a hard material which cannot be easily cut through and which covers the points of connection of at least one rib with the steering wheel rim and the steering wheel hub. As a result, even though the uncovered rim portion or uncovered ribs are cut through, the device still preserves its antitheft functions, and the vehicle remain non-steerable. The body of the device has a U-shaped cross-sectional configuration so that the device can be hooked up over the wheel rim and then locked to the rim by a lock. The device has a side stopper which is constantly shifted into the space between the ribs and a second stopper that rests onto the dashboard of the vehicle, so that in an attempt to turn the steering wheel with respect to the device, the movement of the steering wheel device is limited due to contact of the steering wheel ribs with the side stopper of the device and due to contact of the foldable stopper of the device with the dashboard of the vehicle.

1 Claim, 4 Drawing Sheets

Fig. I

ANTITHEFT LOCKING DEVICE FOR A VEHICLE

FIELD OF THE INVENTION

The present invention relates to devices for preventing unauthorized use of a vehicle, and more particularly, to antitheft locking devices of the type to be installed on a steering wheel and locked to make a vehicle non-drivable by unauthorized persons.

BACKGROUND OF THE INVENTION

Nowadays in United States alone a vehicle is stolen every 19 seconds. Losses from car theft are costing $8 billion a year nationally. Autotheft is a growing problem, affecting both urban and rural communities, as well as all vehicle makes and models.

Heretofore devices of various types have been proposed and introduced in market for preventing the car theft. These devices roughly can be classified as alarms that produces a sound signal, ignition cut-off switches that prevents the car from being started unless the switch is tripped, and steering wheel locking bars that prevent the wheel from turning.

The last group of devices find a very wide application because of simplicity of the use and low cost of the device itself.

One such steering wheel locking bar-type device is produced by Winner International Corporation, USA under the trademark "Club". Unfortunately, none of these devices can guarantee that the vehicle will not be stolen. This is because, even though the auxiliary bars of the antitheft device is difficult to cut, the steering wheel itself is a weak link in the protection system. In other words, while many of the known steering wheel locking bars are relatively indestructible, the steering wheel is not. As a result, an automobile to be protected is actually subject to theft by the simple expedient of cutting through the plastic covered steering wheel rim and removing the protection bar via the cut. The automobile is then steerable and the steering wheel may actually have suffered only relatively minor damage and may be used as it is or with a piece of tape applied over the cut in order to hold the adjacent cut edges of the rim in circular alignment.

The above problem was completely solved by means of an antitheft locking device disclosed by the applicant in his earlier patent application Ser. No. 519715 filed on Aug. 28, 1995 for which a decision to grant a patent was made.

This antitheft locking device has a steering wheel and an engaging member with an end wall covering the steering wheel over its part that includes at least two ribs of the steering wheel. A peripheral wall of the device extends over at least a part of the outer periphery of the steering wheel rim. The device also has a pair of spaced stops protruding from the end wall in the direction perpendicular to the plane of the steering wheel and engageable with the lateral surface ribs. A stop member which protrudes from the periphery of the rim engaging portion is engageable with the dashboard of the vehicle or with any other stationary part of the vehicle body for preventing rotation of the steering wheel. The device is locked in a fixed position by means of a special locking mechanism.

A main distinction of the aforementioned earlier Applicant's device consists in that the durable metal rim-engaging portion of the device which is hard to cut by conventional tools covers a part of the rim periphery and at least two ribs over the entire length of these ribs including the points of connection of the ribs to the rim and steering wheel hub. This means, that even though a thief may cut the portions of the rim not protected by the device, the vehicle still remain non-drivable. This because the device still cannot be removed from the remaining portion of the steering wheel and thus the protection function of the device remains intact.

Although the aforementioned device is efficient and reliable in operation, it is heavier, more expensive than the conventional bar-type antitheft devices, and is inconvenient for storage and handling because of large dimensions and heavy weight.

OBJECTS AND SUMMARY OF THE INVENTION

It is an object of the present invention to provide an antitheft device for a vehicle which cannot be removed from the steering wheel by cutting the parts of the steering wheel, which is light in weight, low in cost, small in size, convenient for storage and handling, and reliable in use.

The applicant has found that his previous device can be significantly improved and produced with smaller dimensions and with lower weight, and hence for a lower cost, by covering at least one rib of the steering wheel, including points of connection of this rib with the rim and the steering wheel hub, when the steering wheel is positioned so that the aforementioned rib is located in the first (upper left) quadrant of the circle of the steering wheel periphery and approximately at 45° to the vertical or horizontal axis.

BRIEF DESCRIPTION OF THE DRAWINGS

FIG. 1 is a plan view of the vehicle antitheft device of the invention in an antitheft position of the steering wheel of a vehicle.

DETAILED DESCRIPTION OF THE INVENTION

Figure 2:
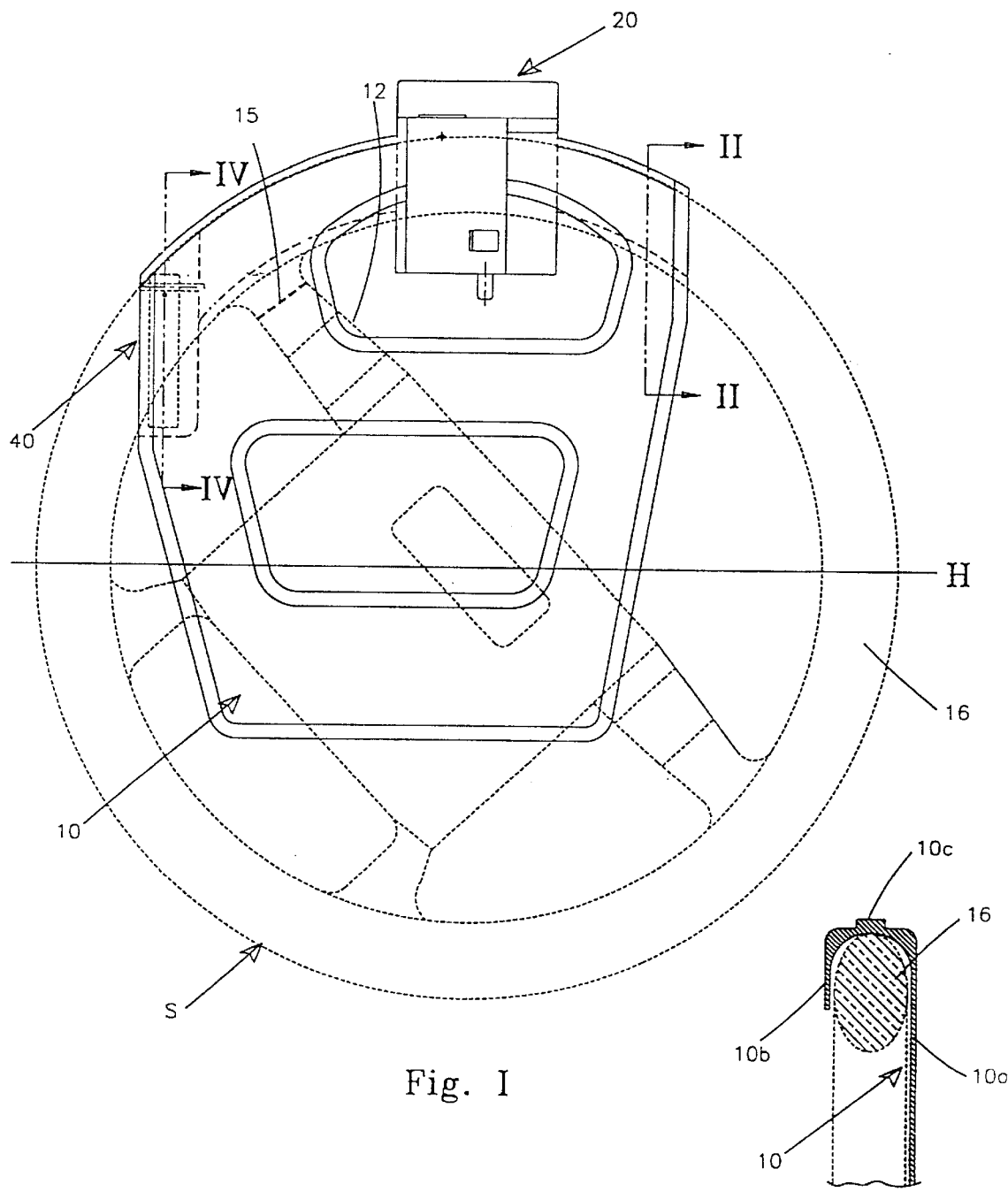
FIG. 2 is a sectional view along line II—II of FIG. 1.

An vehicle antitheft device according to one embodiment of the invention is shown in FIG. 1, which is a plan view of the device in its a working or antitheft position on a the steering wheel of the vehicle. FIG. 2 is a sectional view along line II—II of FIG. 1, and FIG. 3 is a partially broken side view of the device of FIG. 1.

It is known that a steering wheel of any vehicle has a circular rim and ribs which connect the rim to a steering wheel hub. The invention is based on the principle that the antitheft device has a body of a hard material which cannot be easily cut through or broken and that covers the points of connection of at least one rib to the steering wheel hub and the rim, so that even though the rim portion or uncovered ribs are cut through, the device still preserves its antitheft functions, and the vehicle remain non-steerable.

Figures 3, 4:
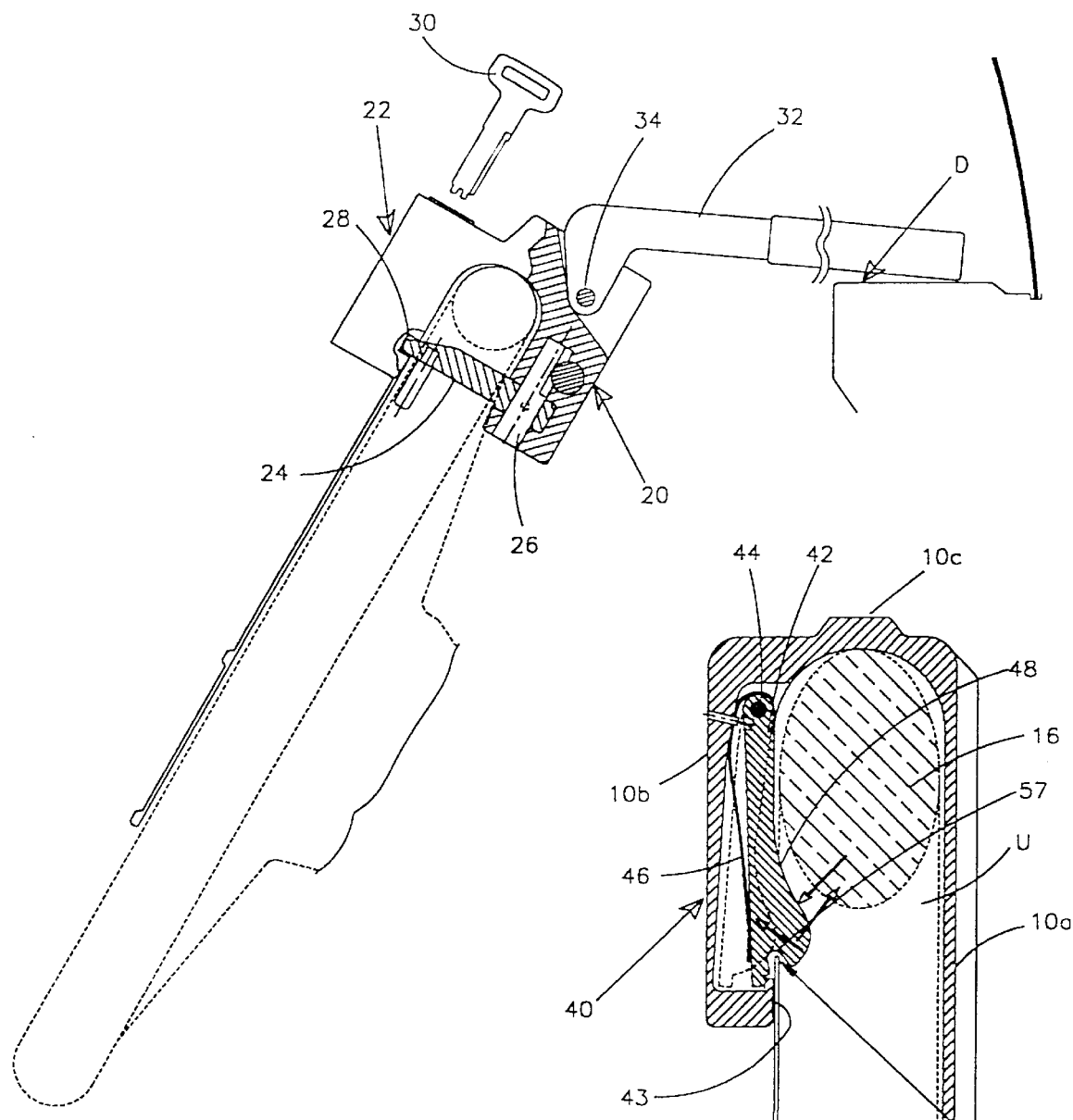
FIG. 3 is a partially broken side view of the device of FIG. 1.
FIG. 4 is a fragmental sectional view along line IV—IV of FIG. 1, illustrating the construction of a lateral spring-loaded locking dog for ribs coplanar with the plane of the steering wheel rib.

As can be seen from FIGS. 1 through 3, the device of the invention is comprised of a rigid metal plate or body 10 of a U-shaped profile with one long side portion 10a and a short side portion 10b (FIG. 2). In the plane of the steering wheel S, i.e., in the plane of the drawing (FIG. 1), long side portion 10a of the body has a substantially rectangular shape so that in the position of a steering wheel S of the type shown in FIG. 1 with a diagonal rib 12 which is inclined to about 30° to 60° to the horizontal line H, long side portion 10a of body 10 covers at least one point of connection of one rib, in this case of rib 12, with the a rim 16 of steering wheel S. In FIG. 1 the aforementioned point of connection is shown by a thick broken line 15.

As shown in FIG. 2, long side portion 10a and short side portion 10b form a hook-like construction which is hooked up onto a portion of steering wheel S. Therefore in the top view shown in FIG. 1, the peripheral portion 10c of body 10 which interconnects long side portion 10a with short side portion 10b has an arc-shaped profile.

Aforementioned arc-shaped peripheral portion 10c has a boss 20. As show in FIG. 3, boss 20 also has a U-shaped cross-section in a side view of the device with walls much thicker than long and short side portions of the device. Boss 20 serves as a housing for a lock 22 which is intended to fix the device in the locking position on the steering wheel S. Boss 20 pivotally supports a latch bolt 24 which can be turned around its pin 26 so that it is introduced into a slot 28 of lock 22 and is locked in this slot by means of a spring-loaded locking element (not shown), as in the case of a conventional door lock. As a result, the entire device is secured to steering wheel S, and unauthorized person cannot remove the device from steering wheel.

The construction of lock is beyond the scope of the present invention. Lock of any conventional type may be incorporated into the device of the invention for the purposes described above. An example of such a lock is disclosed, e.g., in an earlier filed patent application of the same applicant (U.S. Ser. No. 08/519, 716) for which a decision was made to grant a patent.

An elongated foldable stopper 32 is pivotally connected to boss 20 so that it can be turned around a pin 34 between a storage or folded position (not shown) and a working unfolded position shown in FIG. 3, in which it rests with its free end on a stationary part of the vehicle, e.g., a dash board D of the vehicle.

An essential feature of the invention is a side stopper 42 that is shown in detail in FIG. 4, which is a sectional view along line IV—IV of FIG. 1. It can be seen from FIG. 4 that short side portion 10b of the device of the invention has a second boss 40 which is hollow and is of a U-shaped cross-sectional configuration. Side stopper 42 is located inside hollow boss 40 and is hinged on a pivot pin 44. Stopper 42 is constantly urged by a leaf spring 46 in the inward direction, i.e., into the space U between the steering wheel ribs where it is positioned below the upper plane P of steering wheel S and below an edge 43 which is formed on the inner side of boss 40 and is directed toward long side portion 10a of the device body.

On its inner side that faces the steering wheel, side stopper 42 has a camming profile 48 for engagement with the circular or elliptical cross-sectional profile of steering wheel rim 16, so that when the device is hooked up with its peripheral U-shaped portion onto steering wheel rim 16, with further movement of the device onto steering wheel S, camming surface 48 of side stopper 42 will slide over the curved surface of steering wheel rim 16 until it snaps under the effect of spring 46 into space U. On its free end, side stopper 42 has a V-shaped groove 52. The upper side of V-shaped groove 52 is hidden inside boss 40, and the lower side of V-shaped groove 52 projects below the plane of boss 40 and has a camming surface 48. An apex 57 of V-shaped groove 52 is located below edge 43 in the direction toward long side portion 10a. In other words, the lower side of boss 40 and camming surface 48 are arranged so that if a thief tries to unlatch side stopper 42, e.g., with a screwdriver blade 54, it will, on the contrary, push stopper 42 further down.

The embodiment of the device shown and described with reference to FIGS. 1 through 4 is applicable to vehicles having a cross-sectional shape of steering wheel S of the type shown in FIG. 4, i.e., with an inclined rear side 58 of rib 12 located further from the peripheral portion of steering wheel S than the inner edge of boss 40.

When the antitheft device of the invention is fixed in its working position shown in FIGS. 1 through 4, steering wheel S cannot be turned with respect to the antitheft device of the invention because rib 12 stops against side stopper 42 of the device. On the other hand, the antitheft device itself cannot be turned with respect to a stationary part of the vehicle, in this case the dash board of the vehicle, because of contact of foldable stopper 32 with the dash board. Thus the vehicle becomes undrivable.

Figure 5:
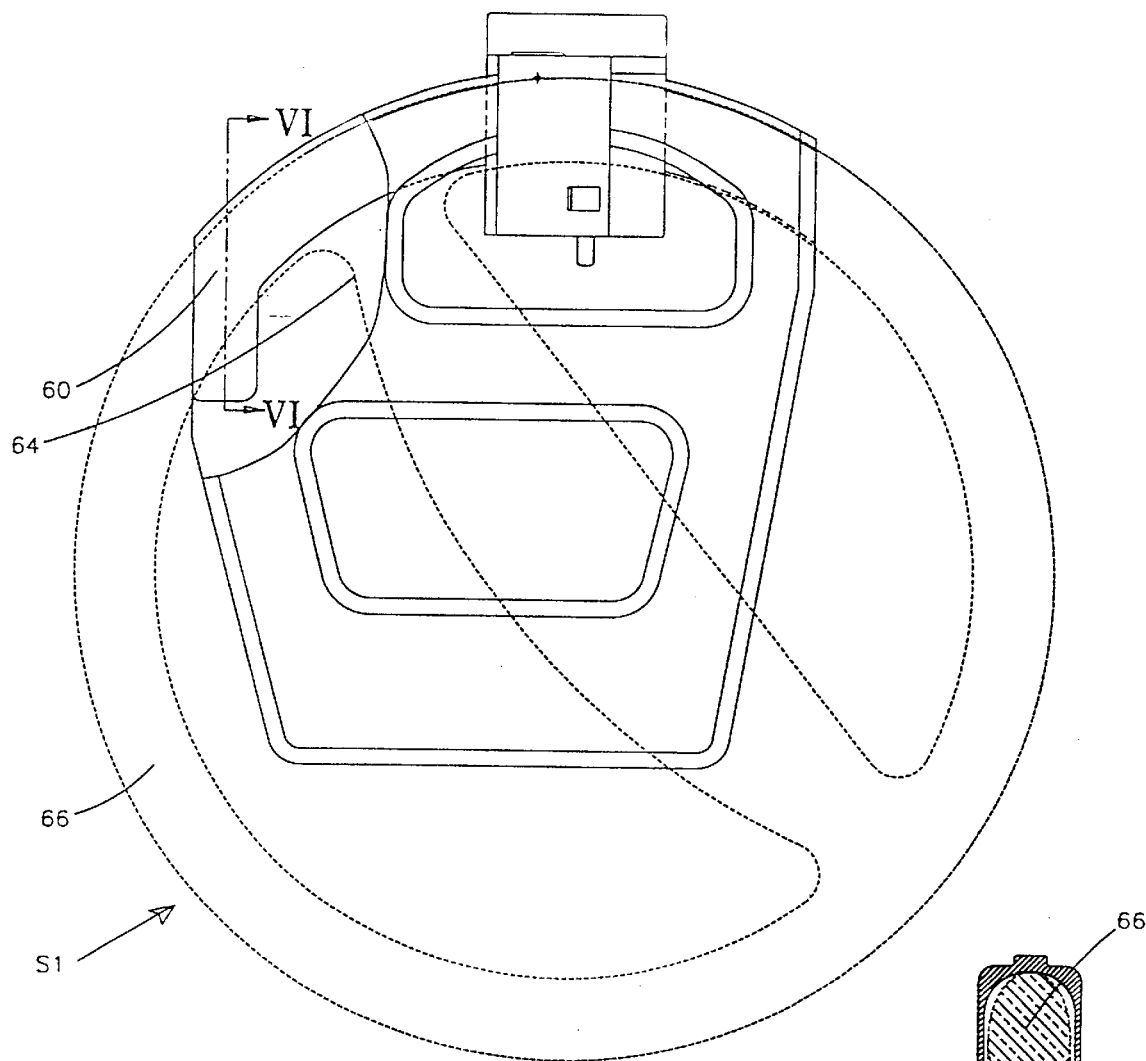
FIG. 5 is a view similar to FIG. 1 illustrating an embodiment of the invention with a stationary lateral stopper for ribs of a tapered profile.
Figure 6:
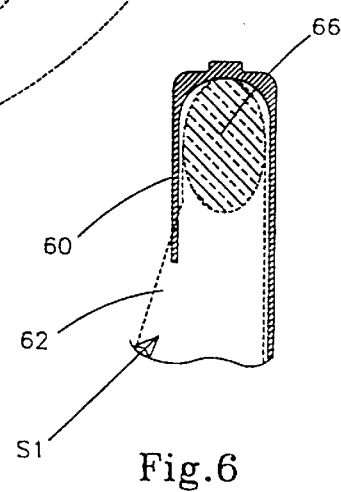
FIG. 6 is a sectional view along line VI—VI of FIG. 5.

An embodiment of the device of the invention with a stationary lateral stopper for ribs of a tapered profile is shown in FIGS. 5 and 6, wherein FIG. 5 is similar to FIG. 1, and FIG. 6 is a sectional view along line VI—VI of FIG. 5.

In general, the device of FIG. 6 is the same as the one shown in FIG. 1, with the exception that a side stopper, which in this case is designated by reference numeral 60, has a more simplified construction and has no moving parts. As can be seen from FIG. 6, side stopper 60 is made in the form of a rigid projection that extends radially inwardly to the length sufficient for engagement with the side surface 62 of a steering wheel rib 64, in case an attempt is made to turn the steering wheel S1 of the type shown in FIGS. 5 and 6 with respect to the antitheft device.

As can be seen in FIG. 6, the device of the type shown in FIGS. 5 and 6 is more suitable for steering wheels in which the inclination of the back side of the ribs begins directly from the point of connection of the rib with the peripheral surface of a steering wheel rim 66.

Figure 7:
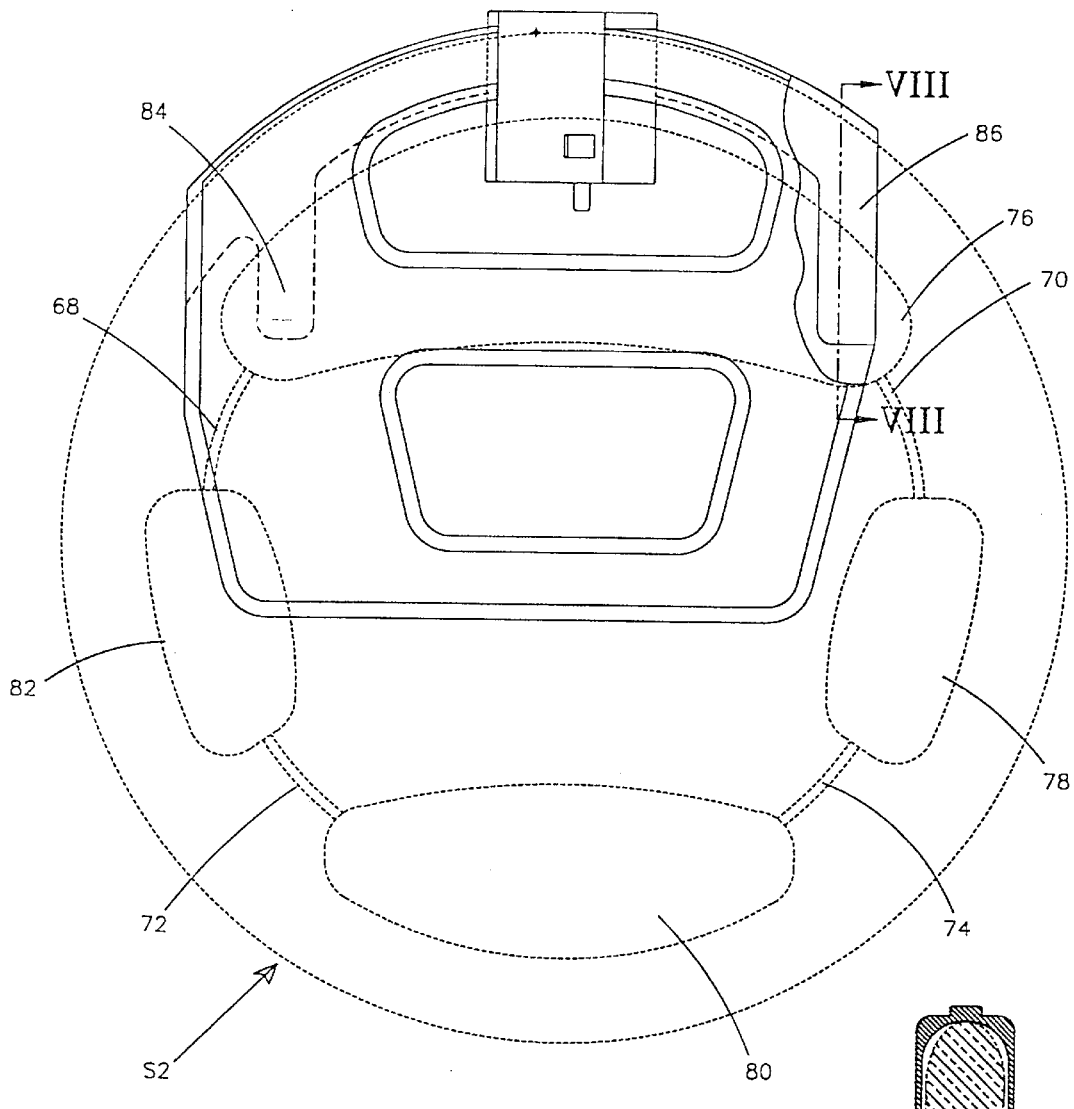
FIG. 7 is another embodiment of the vehicle antitheft device of the invention with stoppers projecting between the ribs.
Figure 8:
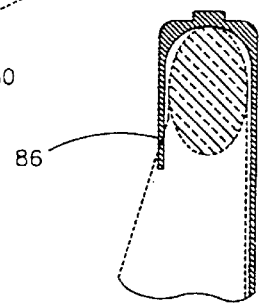
FIG. 8 is a sectional view along line VIII—VIII of FIG. 7.

An embodiment of the invention shown in FIGS. 7 and 8 is applicable to vehicles with steering wheels of the type shown in FIG. 7. In a steering wheel S2 of this type, the function of ribs is fulfilled by rim sections 68, 70, 72, and 74 between openings 76, 78, 80, and 82 of the steering wheel. For the steering wheels of this type it is expedient to utilize the antitheft device with stoppers 84 and 86 insertable into an opening, e.g., opening 76 between adjacent ribs 68 and 70.

Depending on the shape and configuration of the ribs, stoppers may be in the form of projection 86 shown in FIG. 8, or in the form of a moveable side stopper 42 of the type shown in FIG. 4.

Operation

The device of the invention, according to any embodiment described above, is placed onto a steering wheel of the vehicle, which is to be protected from driving by a nonauthorized person, by turning foldable stopper 32 around pin 34 into an unfolded position, and the device is placed onto the top surface of the steering wheel so that foldable stopper 32 rests with its free end on a dash board D of the vehicle and the U-shaped peripheral portion of the device is hooked up onto the rim of the steering wheel. For this purpose, latch bolt 24 of lock 22 must be in an unlocked position. The device is placed onto the steering wheel so that only one rib of the steering wheel is covered. It is a compulsory requirement that the rib of the steering wheel which has to be covered by the device of the invention be located in the first (upper left) quadrant of the steering wheel and be arranged at an angle of 30° to 60° with respect to the horizontal line passing through the center of the steering wheel. In its antitheft position shown in FIG. 1, the antitheft device of the invention covers at least one rib (rib 12 in the embodiment of FIG. 1) and a point 15 of connection of rib 12 to rim 16.

More specifically, in the case of the embodiment shown in FIGS. 1, side stopper 42 is located in the upper left quadrant of the steering wheel to the left from rib 12. When the device is hooked up with its peripheral U-shaped portion onto steering wheel (see broken line 50 in FIG. 4), with further movement of the device onto steering wheel S, camming surface 48 of side stopper 42 will slide over the curved surface of steering wheel rim 16 until it snaps under the effect of spring 46 into space U.

After installing the device into the position shown in FIG. 3, latch bolt 24 is turned around its pin 26 and is snapped in slot 28 of lock 22 whereby the device is fixed to the steering wheel, and foldable stopper 32 rests with its free end on dash board D of the vehicle (FIG. 3).

With the device of the embodiment of FIG. 1 installed on steering wheel S, an unauthorized person cannot drive the vehicle because the movement of the steering wheel rib is limited by the side stopper of the device and because the device itself is immobilized due to contact of foldable stopper 32 with dash board D. Furthermore, if a thief tries to unlatch side stopper 42, e.g., with a screwdriver blade 54, the provision of V-shaped groove 52 will, on the contrary, push stopper 42 further down.

In order to remove the device from the steering wheel by cutting, the thief must cut through the strong and heavy body of the device, which is impractical and will take a significant time with the use of special powerful cutting devices. On the other hand, cutting through the rim will not make the vehicle drivable, because the portion of the wheel rim which supports the antitheft device of the invention remains intact. This means that even though the steering wheel rim can be cut through in the exposed areas, the vehicle still remains nonsteerable since the device preserves its functions.

The principle describe above is equally applicable to other embodiments of the device, with the distinction that, depending on the specific embodiment, the side stopper will engage a tapered side of the rib, and the device will have either one side stopper located on one side of the rib or two stoppers placed between the adjacent ribs.

The device can be easily removed from the steering wheel by unlatching the lock, shifting the device upward for removing the U-shaped peripheral portion from the rim, and raising the device from the steering wheel.

Thus it has been shown that the invention provides an antitheft device for a vehicle which cannot be removed from the steering wheel by cutting through the parts of the steering wheel, which is light in weight, low in cost, small in size, convenient for storage and handling, and reliable in use.

Although the invention has been described and illustrated with reference to specific embodiments, it is understood that these embodiments do not limit the scope of the invention and that any changes and modifications with regard to the shape, dimensions, materials, and configurations are possible, provided they do not depart from the scope of the appended claims. For example, steering wheel may have different constructions and arrangement of ribs and openings. The device may have different shape in a top view. The lock may be of any type suitable for locking the device on the steering wheel. The device can be made of a stainless steel, hardened aluminum casting, etc. The side stopper can be pressed toward the steering wheel by means other than the leaf spring shown in FIG. 3. In other words, the specific embodiments were shown only for illustrative purposes.

We claim:

1. An antitheft locking device for a vehicle which is attachable to a steering wheel of said vehicle in an antitheft position, said vehicle having a steering wheel hub for attaching said steering wheel to a steering wheel column, said steering wheel having a rim and at least one rib which connect said rim to said steering wheel hub at points of interconnection, the antitheft working device comprising a body of a hard material having a U-shaped cross-sectional profile with a long side portion of said U-shaped profile which, in said antitheft position, is adapted to cover a front plane of said steering wheel, and a short side portion of said U-shaped profile to be arranged, in said antitheft position, behind said steering wheel; said long side portion of said body is adapted to cover, in said antitheft position, said points of interconnection between said at least one rib and said rim; a lock in said body for locking said device to said steering wheel in said antitheft position; at least one first stopper on said short side portion with at least a part of said at least one first stopper engageable with said at least one rib when an attempt is made to turn said steering wheel in one direction with respect to said antitheft locking device; and a second stopper attached to said body and engageable with a stationary part of said vehicle when an attempt is made to turn said antitheft locking device in any direction with respect to said stationary part of said vehicle, said short side portion having a hollow boss that receives said at least one first stopper, an inner side of said boss having an edge portion directed toward said long side portion, said at least one first stopper having a V-shaped groove with an apex of said V-shaped groove being located below said edge portion in said direction of said long-side portion, when said first stopper is snapped ins aid position for engaging said side surface.

* * * * *